June 3, 1941.   H. R. C. ANTHONY   2,243,938
LEAKPROOF DRY CELL
Filed March 3, 1939
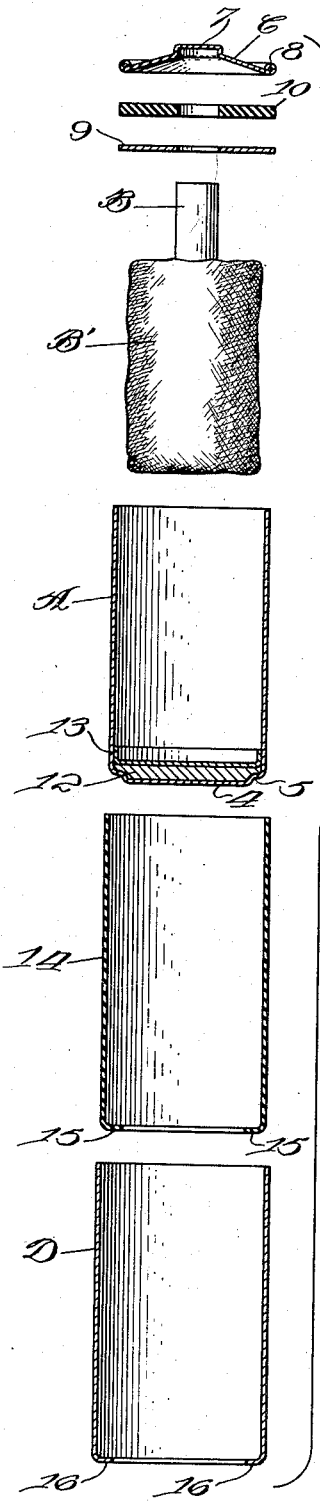
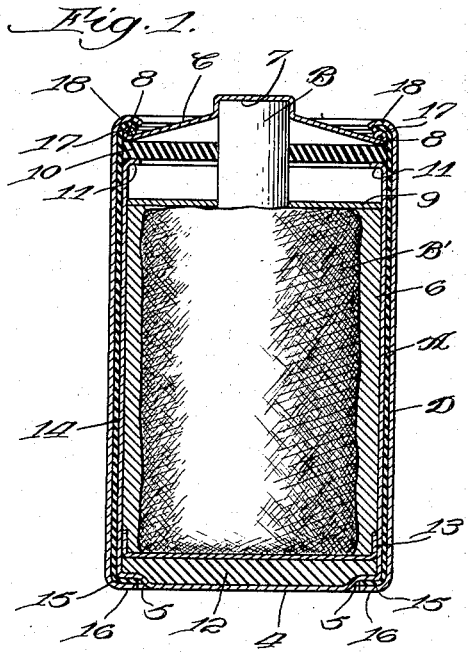
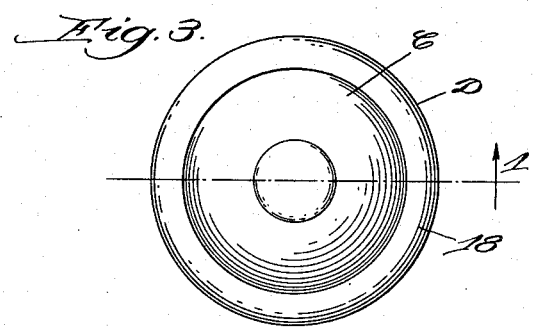
Inventor:
Herman R. C. Anthony.
By Chritton, Wiles, Davies, Hirsch & Dawson.
Attys.

Patented June 3, 1941

2,243,938

UNITED STATES PATENT OFFICE 2,243,938

LEAKPROOF DRY CELL

Herman R. C. Anthony, Madison, Wis., assignor to Ray-O-Vac Company, a corporation of Wisconsin Application March 3, 1939, Serial No. 259,639

3 Claims. (Cl. 136—107)

This invention relates to dry-cells of the type used in flash light casings and the like, and more particularly to an improved metal sheath which will protect the cell from injury and will also prevent fluids from leaking out of the cell and injuring the casing or other dry-cells within the casing.

The present invention is a continuation-in-part of my application Serial No. 211,073, filed May 31, 1938.

The primary object of the present invention is to provide an improved leak-immunized dry-cell and method of manufacturing the same.

In using dry-cells it has been a common experience that if the cell is short circuited, or placed under a heavy load for a considerable length of time, the cell will expand and liquids leak out through the walls of the cell. The liquids usually include zinc chloride and ammonium chloride and will, in a short time, injure the metal walls of the casing which are commonly made of brass. If the cell is allowed to remain in the casing for a considerable length of time, it will often swell and freeze to the casing so that it is very difficult to remove it. Frequently two or more cells are used in a single casing and electrolyte leaking from one cell to another will short circuit the adjacent cell so as to destroy its usefulness and aggravate the damage to the casing.

Flash light cells usually are manufactured with a wax coated disk in the bottom part of the cell or cup which partially embraces the end of the depolarizing-mix and retards the action of the electrolyte on the bottom wall of the cup. As a result of this protection, the cup usually gives out first at its side walls, slightly above the bottom, and this is where the electrolyte is most likely to leak out after the cell has been in use for a long period. By protecting the side walls of the cup, most of the danger of leakage is avoided, but in some cases it is desirable to provide additional protection for the bottom and top of the cell.

Another object of the present invention is to provide a strong metal sheath which will closely and rigidly confine the cell to a given length and diameter. It has been found that without such protection cells frequently swell so much in diameter that they stick in the casing and sometimes elongate sufficiently to damage the casing. The zinc commonly used as an electrode and as a cup for the electrolyte is too weak by itself to prevent such action.

Another object of the invention is to provide a strong metal sheath or jacket which may be insulated from both terminals of the cell so that it will be unnecessary to use an insulating cover or label to prevent the cell from short circuiting on the side walls of the casing.

Another object of the invention is to provide additional protection for the bottom wall of the zinc cup and to protect the metal top closure from the corrosive action of the chemicals in the cell.

Still another object of the invention is to provide an improved hood or cap for the top of the cell and a compressive insulating washer which not only protects the hood from chemical action but serves as a cushion whereby the metal sheath may draw the hood firmly against the top of the cell and form a seal which is practically air tight.

The invention is illustrated in preferred embodiments in the accompanying drawing, in which—

Figure 1 is a vertical sectional view of a dry cell embodying the invention, taken as indicated at line 1 of Figure 3; Figure 2, an exploded view of various parts which go into the assembly; and Figure 3, a top plan view of the completed cell.

In the embodiment illustrated, A designates a zinc cup which serves as a negative electrode for the cell; B, a carbon electrode provided with a depolarizing-mix B'; C, a metal hood or top closure for the cell; and D, a metal sheath which encloses the cell.

The cup A preferably has a downwardly extending boss 4 surrounded by an annular shoulder 5 which is gripped by a flange of the steel jacket in the completed cell, leaving the end of the boss flush with the end of the jacket.

The upwardly extending carbon pole B and the depolarizing-mix B' are of the usual construction. The depolarizing-mix is submerged in electrolyte 6 which usually is jelled by placing the cell in hot water after the positive electrode has been inserted.

The cap C is made of metal and has a socket 7 which fits snugly over the upper end of the carbon pole B. The peripheral portion of the cap is curled inwardly, as indicated at 8, to form a bead which is gripped by the metal sheath in the final operation. Several safeguards are provided to prevent the chemicals within the cell from attacking and corroding the metal hood. A paraffin coated washer 9 is slipped down over the carbon pole B, and a rather heavy asphalt top washer 10 snugly fits around the pole B and is interposed between the bead 8 and an inturned flange 11 on the top of the zinc cup A. This washer is somewhat compressible so that a very tight fit may be obtained. An additional safeguard is a protective coating applied to the underside of the hood C outside of the socket 7. While heretofore caps for the carbon pole have been usually made of brass, it is found that other stronger metals may be used. If the material is ferrous, it is desirable to give the underside a plating which may be 80% lead and 20% tin. Various acid resistant paints are available and can be used on the underside of the hood to further protect it.

An improved method of manufacture has been developed which will now be described. The electrode A is first drawn in the usual cup form. A rather thick asphalt washer 12 is then placed in the bottom of the cup and the cup is then placed in a die which forms the boss 4 and shoulder 5. If desired, a paper washer 13 may be placed over the asphalt washer 12 to prevent the plunger of the die from sticking to the asphalt. The placing of the asphalt washer in the bottom of the can before the final stamping operation has several advantages. It is sufficiently yielding to cause the bottom of the can to accurately follow the shape of the female die without excessive strain on the metal, and the pressing operation insures a perfect fit between the washer and the bottom of the cell. This eliminates any possibility of corrosive material working down between the washer and the bottom of the cell.

The next step is to pour the electrolyte into the cell and introduce the carbon pole B with the depolarizing-mix B'. The latter operation will cause the electrolyte to well-up around the depolarizing-mix and the electrolyte is usually then subjected to heat which causes it to set as a kind of paste. If desired, the paraffin washer 9 may then be placed in the top of the can and the top marginal portion of the can is turned inwardly to form the flange 11 upon which the compression washer 10 is to rest.

An insulating sheet 14 of tubular form, having an open bottom and an inturned end flange 15, is then slipped over the cell, and this assembly is inserted into the metal sheath D which also has an open bottom and an end flange 16.

The asphalt top washer 10 is then forced over the carbon pole B and brought to rest on the flange 11 of the zinc cup. The socket 7 of the hood C is next fitted over the end of the carbon pole and the bead 8 brought to bear against the outer edge portion of the washer 10. The top edge of the sheath 14 is then turned inwardly over the bead 8, as indicated at 17, and a top marginal portion 18 of the sheath D is then crimped over the bead 8 and paper flange 17. The latter action draws the assembly together firmly so that the cell is practically air tight. It may be noted that the sheath D is insulated from both electrodes. This is accomplished by the insulating sheet 14 with its end flanges 16 and 17. Of course, the order of steps when producing the cell may be varied in order. For example, the tubular insulating sleeve 14 might be inserted in the sheath D before the cup A is inserted. However, the indicated sequence of steps is the preferred one.

The foregoing detailed description has been given for clearness of understanding only, and no unnecessary limitations should be understood therefrom, for some modifications will be obvious to those skilled in the art.

I claim:

1. A leak-immunized cell provided with circuit terminals at opposite ends, comprising: a cup-shaped metal electrode having an inwardly extending top flange containing electrolyte; a carbon electrode and depolarizing-mix in said electrolyte; a compression washer snugly impaled by said carbon electrode and resting on said flange; a metal hood forming a closure for the cell and a terminal for said carbon electrode, the marginal portion of said hood being curled upwardly and inwardly to form a bead resting upon the outer marginal edge portion of said washer; a sheet of insulating material enclosing the side wall of the cell and marginal edge portions of both the hood and bottom of said cell; and a protecting metal sheath electrically insulated from both of the electrodes and surrounding said insulating sheet and gripping it firmly against the lower portion of the cell and the upper curved surface of the bead.

2. A leak-immunized cell provided with circuit terminals at opposite ends, comprising: a hollow metal electrode containing electrolyte; a carbon electrode and depolarizing-mix in said electrolyte; a metal hood insulated from said metal electrode and forming a closure for the cell and a terminal for said carbon electrode, the marginal portions of said hood being curled upwardly and inwardly to form a bead; a sheet of insulating material enclosing the side wall of the cell and marginal edge portions of both the hood and bottom of said cell; and a protecting metal sheath electrically insulated from both of the electrodes and surrounding said insulating sheet and gripping it firmly against the lower end of the cell and the upper curved surface of the bead.

3. A dry-cell as specified in claim 2, in which a plastic insulating disk is provided, snugly fitting around the carbon electrode, and gripped between the marginal portions of the hood and top of the metal electrode.

HERMAN R. C. ANTHONY.